United States Patent
Shin et al.

(10) Patent No.: US 10,697,385 B2
(45) Date of Patent: Jun. 30, 2020

(54) ENGINE CONTROL METHOD FOR VEHICLE

(71) Applicants: Hyundai Motor Company, Seoul (KR); KIA Motors Corporation, Seoul (KR)

(72) Inventors: Hyun Wook Shin, Anyang-si (KR); Sang Moo Lee, Goyang-si (KR); Seung Suk Yoon, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/415,018

(22) Filed: May 17, 2019

(65) Prior Publication Data

US 2020/0141343 A1 May 7, 2020

(30) Foreign Application Priority Data

Nov. 5, 2018 (KR) .................. 10-2018-0134094

(51) Int. Cl.
*F02B 37/00* (2006.01)
*F02D 41/10* (2006.01)
(Continued)

(52) U.S. Cl.
CPC .......... *F02D 41/1446* (2013.01); *F02B 37/00* (2013.01); *F02B 37/02* (2013.01);
(Continued)

(58) Field of Classification Search
CPC ...... F02B 37/00; F02D 41/0007; F02D 41/10; F02D 41/1446; F02D 41/1447; F02D 2200/101; F02D 2200/602; F02D 2200/703; F02D 2200/704; F02D 2250/18; F02D 2250/22; F02D 2250/26
(Continued)

(56) References Cited

U.S. PATENT DOCUMENTS

| | | | |
|---|---|---|---|
| 2011/0023478 A1* | 2/2011 | Oakley | F02D 41/1401 60/599 |
| 2017/0268443 A1* | 9/2017 | Yamazaki | F02D 41/029 |
| 2019/0136747 A1* | 5/2019 | Xu | F02D 41/1454 |

FOREIGN PATENT DOCUMENTS

KR    10-2011-0058965 A    6/2011

* cited by examiner

*Primary Examiner* — Erick R Solis
(74) *Attorney, Agent, or Firm* — Morgan, Lewis & Bockius LLP

(57) ABSTRACT

An engine control method for a vehicle may include a temperature securing determination step of determining, by a controller, whether an exhaust gas temperature before a turbine of a turbocharger is normally secured; a basic determination step of, when the exhaust gas temperature before the turbine is normally secured, obtaining, by the controller, a first compensation torque according to a current state of the vehicle from a first compensation torque map according to the exhaust gas temperature before the turbine, an engine operation mode, engine speed, and atmospheric pressure; and an engine control step of, when the exhaust gas temperature before the turbine is normally secured, determining, by the controller, a final compensation torque on the basis of the first compensation torque and controlling engine torque at a value which is obtained by subtracting the final compensation torque from engine full-load torque.

11 Claims, 2 Drawing Sheets

(51) Int. Cl.
*F02D 41/14* (2006.01)
*F02D 41/30* (2006.01)
*F02D 41/00* (2006.01)
*F02B 37/02* (2006.01)

(52) U.S. Cl.
CPC ..... *F02D 41/0007* (2013.01); *F02D 41/3076*
(2013.01); *F02D 2041/1409* (2013.01); *F02D 2200/101* (2013.01); *F02D 2200/602* (2013.01); *F02D 2200/703* (2013.01); *F02D 2250/18* (2013.01); *F02D 2250/22* (2013.01); *F02D 2250/26* (2013.01)

(58) Field of Classification Search
USPC ............... 701/102, 110; 123/406.23, 406.25, 123/406.51, 406.52, 492, 559.2
See application file for complete search history.

ENGINE CONTROL METHOD FOR VEHICLE

CROSS REFERENCE TO RELATED APPLICATION

The present application claims priority to Korean Patent Application No. 10-2018-0134094, filed Nov. 5, 2018, the entire contents of which is incorporated herein for all purposes by this reference.

BACKGROUND OF THE INVENTION

Field of the Invention

The present invention relates generally to an engine control method for a vehicle and, more particularly, to a technique of controlling engine full-load torque.

Description of Related Art

In general, engine full-load torque denotes torque generated by an engine when a driver fully depresses an accelerator pedal and usually changes according to engine speed, atmospheric pressure, and the like.

The full-load torque as described above needs to be limited to an appropriate level to secure durability of hardware forming the engine and satisfy various regulations.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an engine control method for a vehicle, wherein more appropriate engine torque control is performed in consideration of an engine operation mode, an exhaust gas temperature, and the like, thus satisfying various regulations and ensuring durability of engine hardware, while maximizing output of an engine.

According to various aspects of the present invention, there is provided an engine control method for a vehicle, the method including:

a temperature securing determination step of determining, by a controller, whether an exhaust gas temperature before a turbine of a turbocharger is normally secured;

A basic determination step of, when the exhaust gas temperature before the turbine is normally secured, obtaining, by the controller, a first compensation torque according to a current state of the vehicle from a first compensation torque map according to the exhaust gas temperature before the turbine, an engine operation mode, engine speed, and atmospheric pressure; and An engine control step of, when the exhaust gas temperature before the turbine is normally secured, determining, by the controller, a final compensation torque on the basis of the first compensation torque and controlling engine torque at a value which is obtained by subtracting the final compensation torque from engine full-load torque.

The method may further include an additional determination step of, when the exhaust gas temperature before the turbine is normally secured, obtaining, by the controller, a difference between the exhaust gas temperature before the turbine and a predetermined limit temperature and obtaining a second compensation torque which is a proportional integral (PI) feedback control amount determined according to the engine speed.

Wherein the final compensation torque may be determined by adding the second compensation torque determined in the additional determination step to the first compensation torque.

The method may further include a first range limiting step of determining the final compensation torque by limiting a value obtained by adding the second compensation torque to the first compensation torque to within a predetermined first reference torque range.

The additional determination step may be performed only when the difference between the exhaust gas temperature before the turbine and the limit temperature falls within a predetermined reference temperature range.

The method may further include: an emergency determination step of, when the exhaust gas temperature before the turbine is not normally secured, obtaining, by the controller, a third compensation torque according to the current state of the vehicle from a third compensation torque map according to the engine operation mode, the engine speed, and the atmospheric pressure; and a second range limiting step of, when the exhaust gas temperature before the turbine is not normally secured, determining, by the controller, the final compensation torque by limiting the third compensation torque to within a predetermined second reference torque range.

In the map for obtaining the first compensation torque in the basic determination step, the engine operation mode may include a DePM mode, a DeNOx mode, a DeSOx mode, and a Normal mode, the Normal mode being a general driving situation other than the DePM, DeNOx, and DeSOx modes.

The present invention can enable more appropriate engine torque control to be performed in consideration of the engine operation mode, the exhaust gas temperature, and the like, thus satisfying various regulations and ensuring durability of engine hardware, while maximizing output of the engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
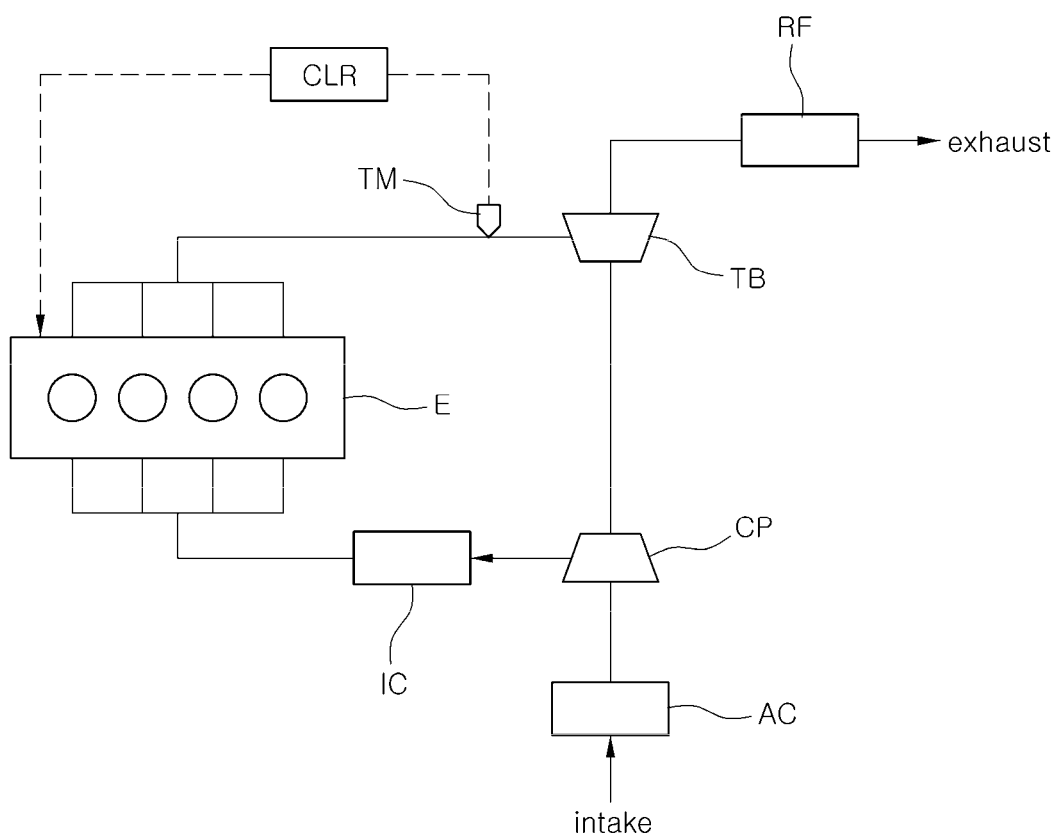
FIG. 1 is a view showing configuration of an engine to which the present invention may be applied.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, various exemplary embodiments of the present invention will be described in detail with reference to the accompanying drawings. Throughout the drawings, the same reference numerals will refer to the same or like parts.

Referring to FIG. 1, exhaust gases discharged from an exhaust manifold of an engine E run a turbine TB of a turbocharger and are then expelled to the atmosphere through an exhaust after-treatment device RF such as a catalyst. A compressor CP run by torque of the turbine TB compresses air drawn in through an air cleaner AC and then the compressed air is cooled by an intercooler IC to be supplied to the engine E through an intake manifold of the engine.

The temperature of exhaust gases entering the turbine TB of the turbocharger, that is, an exhaust gas temperature Tt before the turbine of the turbocharger is measured by a temperature sensor TM and provided to a controller CLR. The controller CLR is configured to control the engine E based on this.

Meanwhile, if the temperature sensor TM for measuring the exhaust gas temperature Tt before the turbine TB is not additionally provided, the controller CLR may obtain the exhaust gas temperature Tt before the turbine by use of a pre-established temperature model for estimating the exhaust gas temperature on the basis of information such as fuel injection quantity of the engine, engine speed, atmospheric pressure, coolant temperature, and the like.

Furthermore, the controller CLR is configured to receive signals from an additional sensor which measures the engine speed and the atmospheric pressure, receive information on the driver's accelerator pedal operation amount from an acceleration position sensor (APS), and control engine torque by controlling fuel injection through an injector.

Figure 2:
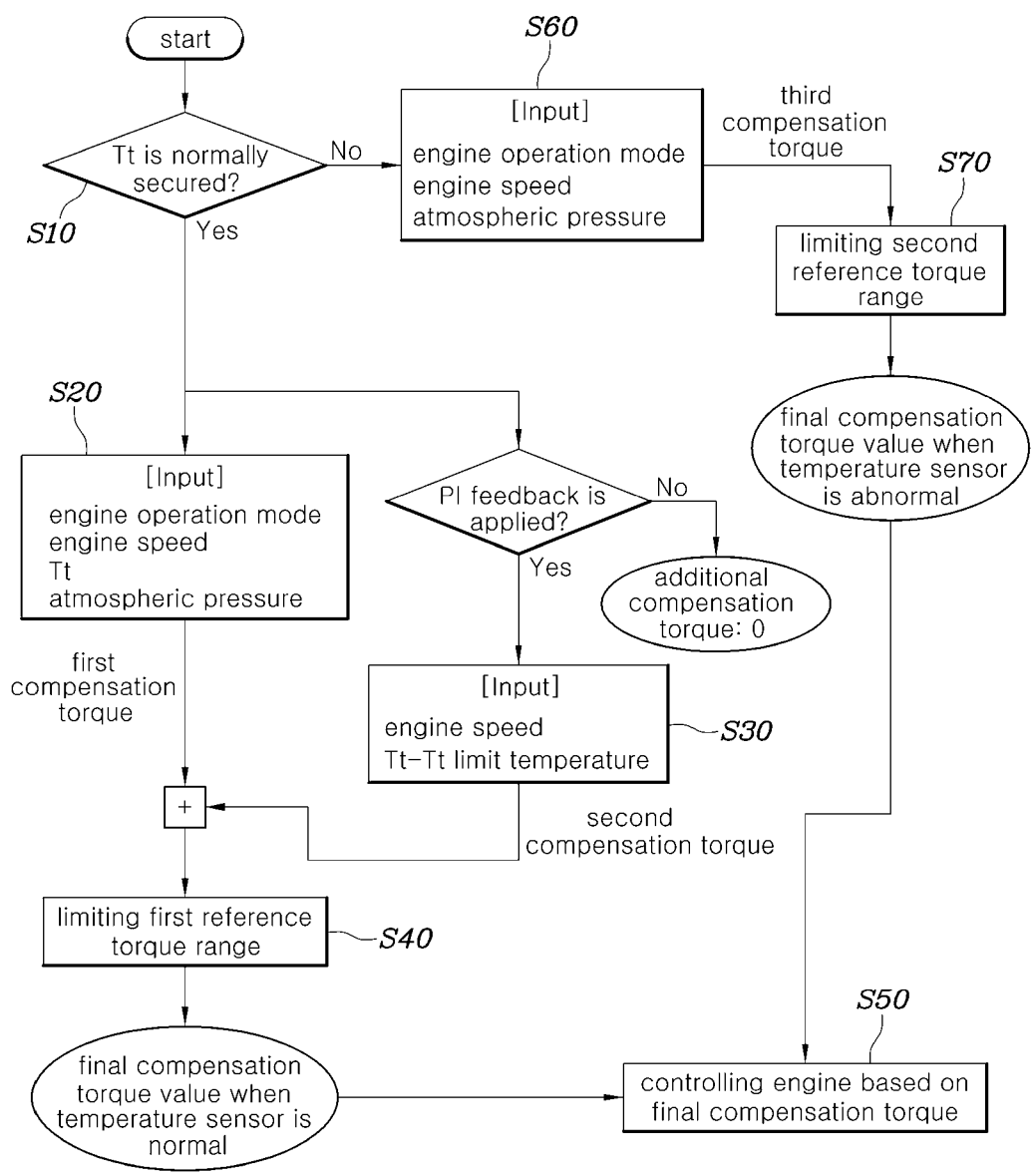
FIG. 2 is a flowchart showing an exemplary embodiment of an engine control method for a vehicle according to an exemplary embodiment of the present invention.

Referring to FIG. 2, an exemplary embodiment of the present invention includes: a temperature securing determination step S10 of determining, by a controller CLR, whether an exhaust gas temperature Tt before a turbine of a turbocharger is normally secured; a basic determination step S20 of, when the exhaust gas temperature Tt before the turbine is normally secured, obtaining, by the controller CLR, a first compensation torque according to a current state of the vehicle from a first compensation torque map predetermined based on the exhaust gas temperature before the turbine, an engine operation mode, engine speed, and atmospheric pressure; and an engine control step S50 of, when the exhaust gas temperature Tt before the turbine is normally secured, determining, by the controller CLR, a final compensation torque on the basis of the first compensation torque and controlling engine torque at a value which is obtained by subtracting the final compensation torque from engine full-load torque.

In other words, the present invention assumes that the engine of a vehicle is in a full-load state when a driver fully depresses an accelerator pedal. When the controller CLR determines that the exhaust gas temperature Tt before the turbine is normally secured by a temperature sensor or a temperature model, the controller obtains the first compensation torque from the first compensation torque map according to a current exhaust gas temperature Tt before the turbine, a current engine operation mode, a current engine speed, and a current atmospheric pressure and determines the final compensation torque on the basis of the first compensation torque, thus controlling engine torque at a value which is obtained by subtracting the final compensation torque from a current engine full-load torque.

For example, if the current engine speed is 1700 RPM, the engine full-load torque in the instant state is 30 kgf·m, and the final compensation torque determined by the above method is 3 kgf·m, a maximum torque of the engine is 30−3=27 kgf·m. Accordingly, the controller CLR controls engine torque at 27 kgf·m.

In the map for obtaining the first compensation torque in the basic determination step S20, the engine operation mode includes a DePM mode, a DeNOx mode, a DeSOx mode, and a Normal mode, the Normal mode being a general driving situation other than the DePM, DeNOx, and DeSOx modes.

For reference, the DePM mode is a mode for regenerating a diesel particulate filter (DPF) by removing particulate matter (PM) accumulated in the DPF. The DeNOx mode is a mode for regenerating a catalyst by reducing nitrogen oxides stored in a nitrogen oxide storage catalyst such as a lean NOx Trap (LNT) and the like, and the DeSOx mode is a mode for removing sulfur oxides accumulated in a catalyst.

The data of the operation modes as described above is applied to the map for obtaining the first compensation torque through a number of experiments and analysis in advance when designing the map. Consequently, the present invention enables optimum engine torque control in correspondence with each operation mode of the engine and the level of the exhaust gas temperature before the turbine, while satisfying regulations without degrading durability of the engine.

Meanwhile, the present invention further includes an additional determination step S30 of, when the exhaust gas temperature Tt before the turbine is normally secured, obtaining, by the controller CLR, a difference between the exhaust gas temperature before the turbine and a predetermined limit temperature and obtaining a second compensation torque which is a proportional integral (PI) feedback control amount determined according to the engine speed, wherein the final compensation torque is determined by adding the second compensation torque determined in the additional determination step S30 to the first compensation torque.

This is to allow the exhaust gas temperature before the turbine to reach the limit temperature while avoiding occurrence of overshoot or undershoot, thus making it possible for the exhaust gas temperature before the turbine to reach the limit temperature as rapidly as possible, whereby stable driving performance of the engine is secured while exhibiting the maximum output.

Herein, the limit temperature is a predetermined value as a hardware limit of the engine or a regulatory limit.

Furthermore, the PI feedback control amount is obtained, for example, by determining an integral feedback amount by multiplying an integral gain according to the engine speed by the difference between the exhaust gas temperature before the turbine and the limit temperature, determining a proportional feedback amount by multiplying a proportional gain predetermined according to the engine speed by a value which is obtained by multiplying a proportional gain predetermined according to the difference between the exhaust gas temperature before the turbine and the limit temperature by the difference between the exhaust gas temperature before the turbine and the limit temperature, and then adding the integral feedback amount and the proportional feedback amount together.

The exemplary embodiment further includes a first range limiting step S40 of determining the final compensation torque by limiting a value obtained by adding the second compensation torque to the first compensation torque to within a predetermined first reference torque range.

This is to prevent the value obtained by adding the first compensation torque and the second compensation torque together from becoming too large or too small, causing excessive compensation.

Thus, the first reference torque range is determined according to vehicle models through experiment and analysis to a level that can prevent such excessive compensation when designed.

For example, the first reference torque range may be set in a range of −5 kgf·m to +5 kgf·m. Herein, when the value obtained by adding the first compensation torque and the second compensation torque together is 7 kgf·m, the final compensation torque is limited to 5 kgf·m.

Meanwhile, the additional determination step S30 may be configured to be performed only when the difference between the exhaust gas temperature before the turbine and the limit temperature falls within a predetermined reference temperature range.

For example, when the reference temperature range is set to equal to or greater than 5° C., if the difference between the exhaust gas temperature before the turbine and the limit temperature is 10° C., the additional determination step S30 is performed, and if the difference is 4° C., the additional determination step S30 is not performed.

On the other hand, when the exhaust gas temperature before the turbine is not normally secured, the present invention includes: an emergency determination step S60 of obtaining, by the controller CLR, a third compensation torque according to the current state of the vehicle from a third compensation torque map according to the engine operation mode, the engine speed, and the atmospheric pressure; and a second range limiting step S70 of determining, by the controller CLR, the final compensation torque by limiting the third compensation torque to within a predetermined second reference torque range.

In other words, when the controller CLR determines that the exhaust gas temperature before the turbine is not normally secured due to an abnormal operation of the temperature sensor or the like, the third compensation torque is obtained using the third compensation torque map and the final compensation torque is determined on the basis of the obtained third compensation torque.

Herein, the second reference torque range may be set substantially equal to the first reference torque range. In the instant case, the second range limiting step S70 is substantially the same as the first range limiting step S40, but may be separately set to a different value.

The second reference torque range is also intended to prevent excessive compensation, so that the second reference torque range is determined through experiment and analysis in advance according to the purpose thereof when designed. However, in such a situation where the abnormal operation of the temperature sensor or the like occurs, it may be preferable that the second reference torque range is set to be narrower than the first reference torque range for more stable control.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An engine control method for a vehicle, the method comprising:
   determining, by a controller, when an exhaust gas temperature before a turbine of a turbocharger is normally secured;
   when the exhaust gas temperature before the turbine is determined to be normally secured, obtaining, by the controller, a first compensation torque according to a current state of the vehicle through a first compensation torque map predetermined according to the exhaust gas temperature before the turbine, an engine operation mode, an engine speed, and an atmospheric pressure; and
   when the exhaust gas temperature before the turbine is determined to be normally secured, determining, by the controller, a final compensation torque on a basis of the first compensation torque and controlling a current engine torque at a value which is obtained by subtracting the final compensation torque from an engine full-load torque.

2. The method of claim 1, wherein the current state of the vehicle includes a current exhaust gas temperature before the turbine, a current engine operation mode, a current engine speed, and a current atmospheric pressure.

3. The method of claim 1, further including an additional determination step performed when the exhaust gas temperature before the turbine is determined to be normally secured, the additional determination step having:
   obtaining, by the controller, a first difference between the exhaust gas temperature before the turbine and a predetermined limit temperature and obtaining a second compensation torque which is a proportional integral (PI) feedback control amount determined according to a current engine speed of the current state and the first difference,
   wherein the final compensation torque is determined by adding an obtained second compensation torque determined in the additional determination step to the first compensation torque.

4. The method of claim 3, wherein the PI feedback control amount is obtained by determining an integral feedback amount by multiplying an integral gain (I) determined according to a current engine speed of the vehicle by the first difference between the exhaust gas temperature before the turbine and the predetermined limit temperature, determining a proportional feedback amount by multiplying a first proportional gain determined according to the current engine speed by a value which is obtained by multiplying a second proportional gain determined according to the first difference between the exhaust gas temperature before the turbine and the predetermined limit temperature by the first difference between the exhaust gas temperature before the turbine and the predetermined limit temperature, and then adding the integral feedback amount and the proportional feedback amount together.

5. The method of claim 3, further including:
determining the final compensation torque by limiting a value obtained by adding the second compensation torque to the first compensation torque to a predetermined first reference torque range.

6. The method of claim 3, wherein the additional determination step is performed only when the first difference between the exhaust gas temperature before the turbine and the predetermined limit temperature falls within a predetermined reference temperature range.

7. The method of claim 1, further including an emergency determination step performed when the exhaust gas temperature before the turbine is determined to be not normally secured, the emergency determination step having:
obtaining, by the controller, a third compensation torque according to the current state of the vehicle from a third compensation torque map predetermined according to the engine operation mode, the engine speed, and the atmospheric pressure.

8. The method of claim 7, further including:
determining, by the controller, the final compensation torque by limiting the third compensation torque to a predetermined second reference torque range.

9. The method of claim 7, wherein the current state of the vehicle includes a current exhaust gas temperature before the turbine, a current engine operation mode, a current engine speed, and a current atmospheric pressure.

10. The method of claim 1, wherein the engine operation mode includes a DePM mode, a DeNOx mode, a DeSOx mode, and a Normal mode, the Normal mode being a general driving situation except the DePM, DeNOx, and DeSOx modes.

11. The method of claim 1, wherein an engine of the vehicle is in the full-load state when an accelerator pedal is fully pressed.

* * * * *